(12) United States Patent
Fang et al.

(10) Patent No.: US 12,675,733 B2
(45) Date of Patent: Jul. 7, 2026

(54) SYSTEMS AND METHODS FOR GENERATING UNIFORM FRAMES HAVING SENSOR AND AGENT DATA

(71) Applicant: Toyota Research Institute, Inc., Los Altos, CA (US)

(72) Inventors: Chao Fang, Sunnyvale, CA (US); Charles Christopher Ochoa, San Francisco, CA (US); Kuan-Hui Lee, San Jose, CA (US); Kun-Hsin Chen, San Francisco, CA (US); Visak Kumar, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 949 days.

(21) Appl. No.: 17/733,476

(22) Filed: Apr. 29, 2022

(65) Prior Publication Data

US 2023/0351244 A1 Nov. 2, 2023

(51) Int. Cl.
*G06N 20/00* (2019.01)
*G07C 5/08* (2006.01)

(52) U.S. Cl.
CPC ........... *G06N 20/00* (2019.01); *G07C 5/0841* (2013.01)

(58) Field of Classification Search
CPC ...... G06N 20/00; G06N 3/0455; G06N 3/092; G07C 5/0841; G01S 13/931;
(Continued)

(56) References Cited

U.S. PATENT DOCUMENTS

2006/0085459 A1 4/2006 Noble et al.
2009/0313270 A1 12/2009 Aust et al.
(Continued)

FOREIGN PATENT DOCUMENTS

| CN | 111581479 A | 8/2020 |
| CN | 114116946 A | 3/2022 |
| KR | 20090132183 A | 12/2009 |

OTHER PUBLICATIONS

Wang et al., "Adapting a Container Infrastructure for Autonomous Vehicle Development," 10th Annual Computing and Communication Workshop and Conference (CCWC), 2019, pp. 0182-0187.
(Continued)

*Primary Examiner* — Pei Yong Weng
(74) *Attorney, Agent, or Firm* — Christopher G. Darrow; Darrow Mustafa PC

(57) ABSTRACT

System, methods, and other embodiments described herein relate to a manner of generating and relating frames that improves the retrieval of sensor and agent data for processing by different vehicle tasks. In one embodiment, a method includes acquiring sensor data by a vehicle. The method also includes generating a frame including the sensor data and agent perceptions determined from the sensor data at a timestamp, the agent perceptions including multi-dimensional data that describes features for surrounding vehicles of the vehicle. The method also includes relating the frame to other frames of the vehicle by track, the other frames having processed data from various times and the track having a predetermined window of scene information associated with an agent. The method also includes training a learning model using the agent perceptions accessed from the track.

18 Claims, 6 Drawing Sheets

(58) Field of Classification Search

CPC ...... G01S 7/4808; G01S 17/86; G01S 17/931; G06F 16/2264; G06F 16/2477; G06F 16/901; G06V 10/82; G06V 20/56

See application file for complete search history.

(56) References Cited

U.S. PATENT DOCUMENTS

| | | |
|---|---|---|
| 2011/0161804 A1 | 6/2011 | Park et al. |
| 2018/0101422 A1 | 4/2018 | Flanigan et al. |
| 2018/0357018 A1 | 12/2018 | Karr et al. |
| 2019/0197778 A1* | 6/2019 | Sachdeva .............. G06F 18/251 |
| 2019/0332120 A1 | 10/2019 | Choi et al. |
| 2020/0265247 A1* | 8/2020 | Musk .................... G06V 20/58 |
| 2021/0192832 A1 | 6/2021 | Grail et al. |
| 2021/0304607 A1* | 9/2021 | Grace .................... G08G 1/166 |

OTHER PUBLICATIONS

Di Nunzio et al., "One Size Fits All: A Conceptual Data Model for Any Approach to Terminology," arXiv:2112.06562, Dec. 13, 2021, pp. 1-9.

Jia et al., "Towards Secure and Safe Appified Automated Vehicles," IEEE Intelligent Vehicles Symposium (IV), 2017, pp. 705-711.

Unknown, "nuScenes," last accessed on Apr. 29, 2022, 7 pages, found at https://www.nuscenes.org/nuscenes#data-format.

* cited by examiner

SYSTEMS AND METHODS FOR GENERATING UNIFORM FRAMES HAVING SENSOR AND AGENT DATA

TECHNICAL FIELD

The subject matter described herein relates, in general, to generating frames having vehicle data, and, more particularly, to generating and relating frames that improves the retrieval of sensor and agent data for processing by different vehicle tasks.

BACKGROUND

Vehicles have sensors providing data that facilitate perceiving agents (e.g., other vehicles), obstacles, pedestrians, and additional aspects of a surrounding environment. For example, a vehicle with a light detection and ranging (LIDAR) sensor uses light to scan the surrounding environment, while logic associated with the LIDAR analyzes acquired data to detect a presence of objects and other features of the surrounding environment. In further examples, cameras acquire information about the surrounding environment from which a system derives awareness about aspects of the surrounding environment. This sensor data is useful for improving perceptions of the surrounding environment so that systems such as automated driving systems can perceive the noted aspects for accurately controlling the vehicle.

In general, the further awareness is developed by the vehicle about a surrounding environment, the better an operator can be supplemented with information for driving assistance or the better an automated system can control the vehicle to avoid hazards. However, a system organizing the sensor and other data acquired from multiple sources for retrieval by vehicle tasks creates difficulties. For example, the data from a LIDAR sensor and perception system is associated with different semantics for an environment surrounding a vehicle. As such, a system organizing this information by frame across time can decrease bandwidth due to size, such as when LIDAR data is retrieved together with unnecessary perception data.

SUMMARY

In one embodiment, example systems and methods relate to a manner of generating and relating frames that improves the retrieval of sensor and agent data for processing by different vehicle tasks. In various implementations, systems acquiring and assembling data from various vehicle sources or systems lead to processing inefficiencies. For example, a system organizing this information by frame across time can decrease bandwidth by retrieving unnecessary versions or forms of data from memory. Therefore, in one embodiment, a control system implements a unified schema (e.g., an organization, format, etc.) for sensor and agent data from a vehicle that provides efficient storage, retrieval, and versioning for vehicle tasks (e.g., motion planning, object tracking, etc.). In particular, the control system generates a frame including sensor data and agent perceptions at a timestamp. Here, the agent perceptions are derived from the sensor data and may include two or three-dimensional data describing features (e.g., relative size) for surrounding vehicles. Furthermore, the system relates the frame to other frames generated at different times by track. In this way, a vehicle task can selectively retrieve sensor data or agent perceptions by type, time, and so on in a track for processing, thereby avoiding the inefficient retrieval of unnecessary data. Accordingly, the control system generates and relates frames for improving bandwidth usage while serving requests by diverse vehicle tasks.

In one embodiment, a control system for generating and relating frames that improves the retrieval of sensor and agent data for processing by different vehicle tasks is disclosed. The control system includes a memory storing instructions that, when executed by a processor, cause the processor to acquire sensor data by a vehicle. The instructions also include instructions to generate a frame including the sensor data and agent perceptions determined from the sensor data at a timestamp, the agent perceptions including multi-dimensional data that describes features for surrounding vehicles of the vehicle. The instructions also include instructions to relate the frame to other frames of the vehicle by track, the other frames having processed data from various times and the track having a predetermined window of scene information associated with an agent. The instructions also include instructions to train a learning model using the agent perceptions accessed from the track.

In one embodiment, a non-transitory computer-readable medium for generating and relating frames that improves the retrieval of sensor and agent data for processing by different vehicle tasks and including instructions that when executed by a processor cause the processor to perform one or more functions is disclosed. The instructions include instructions to acquire sensor data by a vehicle. The instructions also include instructions to generate a frame including the sensor data and agent perceptions determined from the sensor data at a timestamp, the agent perceptions including multi-dimensional data that describes features for surrounding vehicles of the vehicle. The instructions also include instructions to relate the frame to other frames of the vehicle by track, the other frames having processed data from various times and the track having a predetermined window of scene information associated with an agent. The instructions also include instructions to train a learning model using the agent perceptions accessed from the track.

In one embodiment, a method for generating and relating frames that improves the retrieval of sensor and agent data for processing by different vehicle tasks is disclosed. In one embodiment, the method includes acquiring sensor data by a vehicle. The method also includes generating a frame including the sensor data and agent perceptions determined from the sensor data at a timestamp, the agent perceptions including multi-dimensional data that describes features for surrounding vehicles of the vehicle. The method also includes relating the frame to other frames of the vehicle by track, the other frames having processed data from various times and the track having a predetermined window of scene information associated with an agent. The method also includes training a learning model using the agent perceptions accessed from the track.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
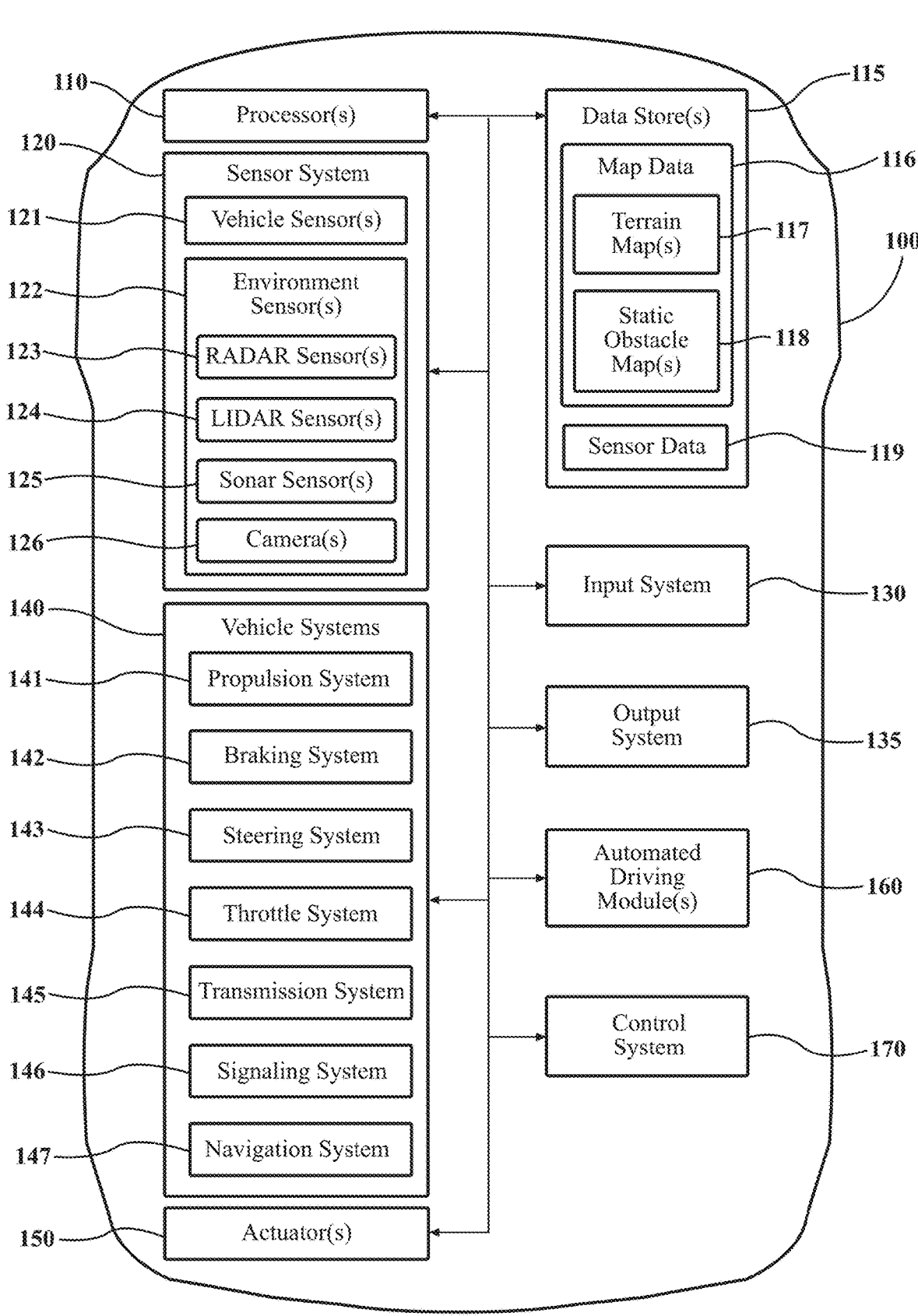
FIG. 1 illustrates one embodiment of a vehicle within which systems and methods disclosed herein may be implemented.

Systems, methods, and other embodiments associated with generating and relating frames that improves the retrieval of sensor and agent data for processing by different vehicle tasks are disclosed herein. In various implementations, vehicle systems request the retrieval of sensor data and agent data (e.g., ado data) in different forms for processing tasks. For example, a deep learning model processes data in a block of multiple frames for a driving scene. On the contrary, a reinforcement learning model may process data per frame in a sequence. As such, a control system managing the storage and retrieval of data leads to inefficiencies or incompatibility when more data than requested is retrieved or retrieval is limited to a frame size (e.g., three frames). Therefore, in one embodiment, a control system acquires, organizes, and structures sensor and agent data associated with a vehicle using an agent-centric schema for versatile retrieval. In particular, the control system acquires data from vehicle sensors and relates raw data, processed light detection and ranging (LIDAR) data (e.g., point clouds, 3D annotations, etc.), and processed image data (e.g., object labels, semantic segmentations, etc.) as datums. Here, a datum can be structured or synchronized data from disparate sources grouped by frames, slices, tracks, and so on. In one approach, a track is a window of frames for a particular agent and a slice is information from a frame for multiple agents at a timestamp. In this way, the control system can retrieve frames flexibly by specific agents, agent type (e.g., 2D agent, 3D agent, etc.), and so on.

Moreover, the control system creates an agent datum having data for 2D and 3D agents. This data includes coordinates for ado vehicles, feature snapshots, and so on. The control system also forms a map datum in the frame as an integrated dataset that simplifies access for vehicle tasks. For example, the dataset is a schema that facilitates training of a map encoder for a ML model through various samples. As such, elements of the map datum can include a map message, dynamic traffic control elements (TCE), zone information, data from traffic lights, and so on structured for selective retrieval by track or slice to a system request.

In various implementations, the control system can apply the agent-centric schema to train a learning model using tracks. For example, the agent-centric schema allows an encoder of the learning model to selectively process agent information by track or sensor data cached in memory. This avoids organizing frames sequentially as part of a preprocessing operation for training operations by the learning model. In particular, the control system may relate consecutive frames in tracks or slices using pointers, thereby allowing non-sequential or random access directly within tracks. For example, tracks include 2D or 3D agent features accessible by blocks of multiple frames associated with a driving scene by time span (e.g., three seconds). Accordingly, the control system uses datums, tracks, and slices for retrieving sensor or agent data from a frame(s) non-sequentially or selectively instead of through a general query, thereby improving bandwidth efficiency.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a control system uses road-side units (RSU), consumer electronics (CE), mobile devices, robots, drones, and so on that benefit from the functionality discussed herein associated with generating and relating frames that improve the retrieval of sensor and agent data (e.g., data for ado vehicles) for processing by different vehicle tasks.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a control system 170 that is implemented to perform methods and other functions as disclosed herein relating to generating and relating frames that improves the retrieval of sensor and agent data for processing by different vehicle tasks.

Figure 2:
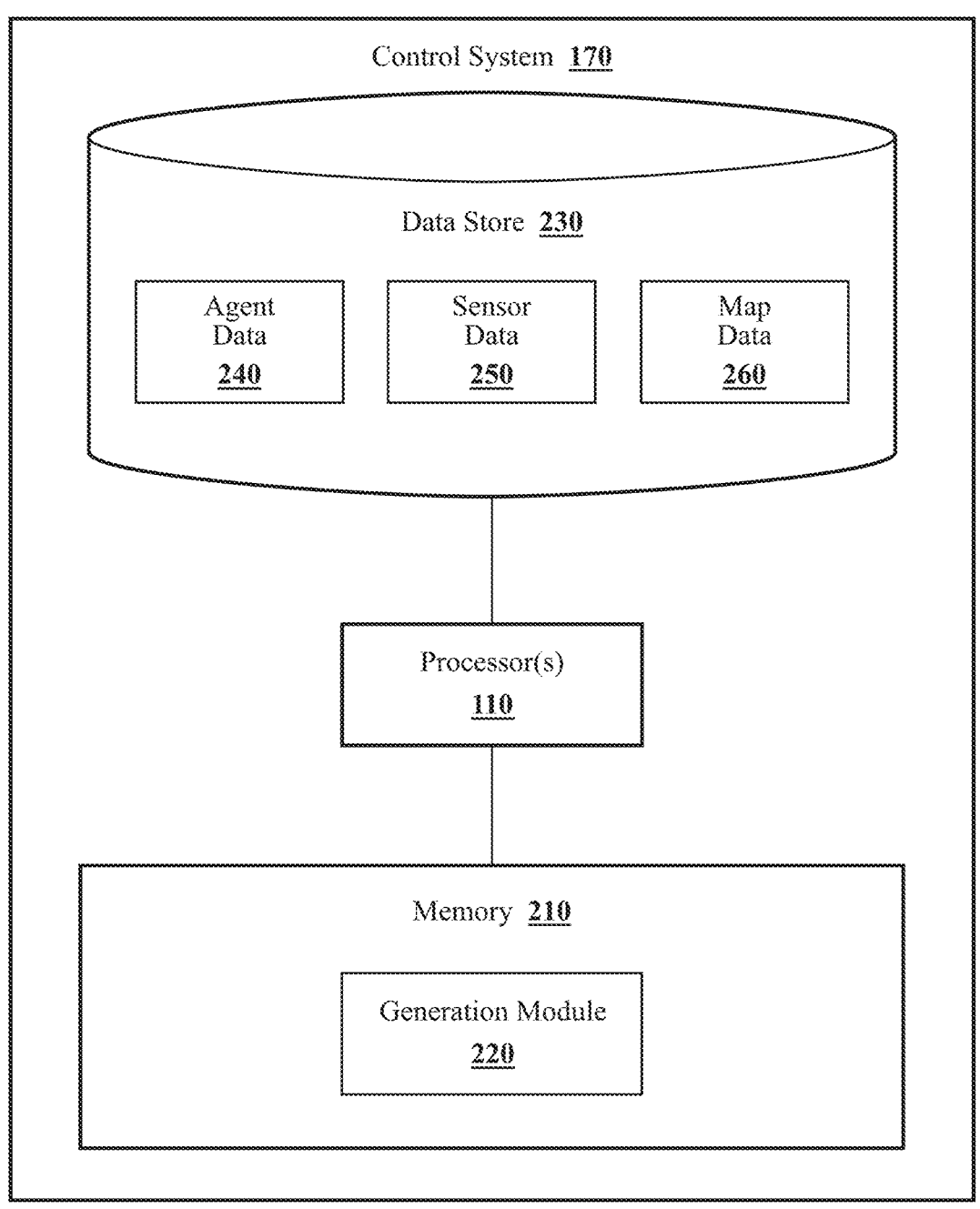
FIG. 2 illustrates one embodiment of a control system that is associated with generating and relating frames for the retrieval of sensor and agent data.

With reference to FIG. 2, one embodiment of the control system 170 of FIG. 1 is further illustrated. The control system 170 is shown as including a processor(s) 110 from the vehicle 100 of FIG. 1. Accordingly, the processor(s) 110 may be a part of the control system 170, the control system 170 may include a separate processor from the processor(s) 110 of the vehicle 100, or the control system 170 may access the processor(s) 110 through a data bus or another communication path. In one embodiment, the control system 170 includes a memory 210 that stores a generation module 220. The memory 210 is a random-access memory (RAM), a read-only memory (ROM), a hard-disk drive, a flash memory, or other suitable memory for storing the generation module 220. The generation module 220 is, for example, computer-readable instructions that when executed by the processor(s) 110 cause the processor(s) 110 to perform the various functions disclosed herein.

The control system 170 as illustrated in FIG. 2 is generally an abstracted form of the control system 170 having modules. Furthermore, the generation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the generation module 220, in one embodiment, acquires sensor data 250 that includes at least camera images. In further arrangements, the generation module 220 acquires the sensor data 250 from further sensors such as radar sensors 123, LIDAR sensors 124, and other sensors as may be suitable for identifying vehicles and locations of the vehicles.

Accordingly, the generation module 220, in one embodiment, controls the respective sensors to provide the data inputs in the form of the sensor data 250. Additionally, while the generation module 220 is discussed as controlling the various sensors to provide the sensor data 250, in one or more embodiments, the generation module 220 can employ other techniques to acquire the sensor data 250 that are either active or passive. For example, the generation module 220 passively sniffs the sensor data 250 from a stream of electronic information provided by the various sensors to further components within the vehicle 100. Moreover, the generation module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the control system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the generation module 220 in executing various functions. In one embodiment, the data store 230 includes the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the agent data 240 and the map data 260. The agent data 240 may form a datum from perceptions derived by the vehicle 100 using the sensor data 250. In one approach, a datum can be structured or synchronized data from various and disparate sources grouped by frames, slices, tracks, and so on. In particular, the control system may synchronize data according to scene changes, agent changes, quality metrics, and so on.

In various implementations, the perceptions include 2D or 3D data that describe features (e.g., relative size) for surrounding vehicles (i.e., agents) of the vehicle 100. Furthermore, the map data 260 can have geographical information, TCE states, road characteristics (e.g., lane orientation, intersection configurations, etc.), and so on. A TCE describes a stop sign, states for bulbs associated with a traffic light, and so on.

The generation module 220, in one embodiment, is further configured to perform additional tasks beyond controlling the respective sensors to acquire and provide the sensor data 250. For example, the generation module 220 includes instructions that cause the processor 110 to generate a frame including the agent data 240, the sensor data 250, and the map data 260 using datums. Here, the agent data 240 may be agent perceptions that include multi-dimensional data that describe features determined from the sensor data 250 at a timestamp for surrounding vehicles. Furthermore, a frame can represent a snapshot for one or more agents associated with a vehicle state or driving scene.

Furthermore, the generation module 220 relates the frame to other frames of the vehicle 100. A frame may be structured atomically with discrete datums having the sensor data 250 and the agent perceptions as snapshots in time. In this way, the control system 170 can provide an agent-centric schema (e.g., an organization, format, etc.) for vehicle and map data that is system agnostic and avoids retrieval errors (e.g., SQL query errors). In particular, the data is organized by the control system 170 in a unified and comprehensive manner that allows disparate systems to perform diverse processing tasks for the vehicle 100 by agent. For example, sequential, non-sequential, direct, or random access requests of the data are supported by the control system 170 due to the frame structure and organization. As such, the control system 170 supports the processing of data by ML models per frame in sequence (e.g., reinforcement learning, transforms, etc.) as well as systems processing scenes periodically.

In one approach, the generation module 220 allows multi-mode access of datasets by frame or agent. As such, the control system 170 supports access by dual-data systems, requests for multi-agent sources (e.g., human annotations, dot tracks, etc.), requests for raw data by agent/time, requests for map data by agent/time, and so on. Furthermore, multi-mode access improves version and software updates to driving stacks by avoiding updating discrete components. Accordingly, the control system 170 improves input/output efficiency of data and dataset scalability through an agent-centric schema and multi-mode access.

Figure 3:
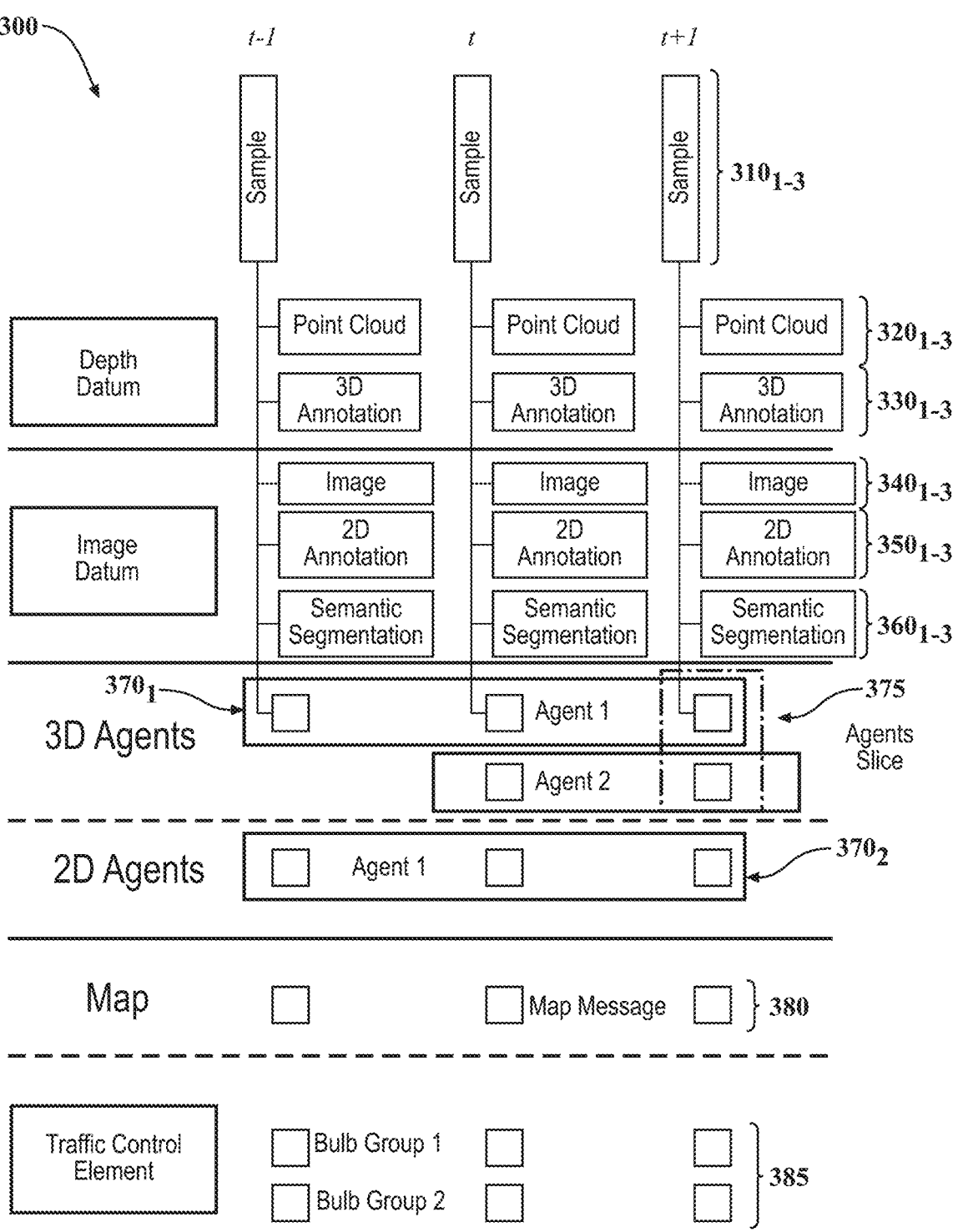
FIG. 3 illustrates one embodiment of the control system generating and relating frames having various vehicle data for a driving scene and using tracks or slices.

Now turning to FIG. 3, one embodiment of the control system 170 generating and relating frames having various vehicle data for a scene and using tracks or slices is illustrated. The storage and retrieval system 300 includes frames $310_{1-3}$ having data from samples or snapshots at times t−1, t, and t+1. Here, a frame is extended to include the sensor data 250, the agent data 240, and the map data 260 for improving the processing efficiency of vehicle tasks. The sensor data 250 can include robust raw data for the vehicle 100, a depth datum, and an image datum. The depth datum can use LIDAR data for the control system 170 to derive point clouds $320_{1-3}$ and 3D annotations $330_{1-3}$ describing objects surrounding the vehicle 100. For example, the control system 170 represents a 3D annotation in LIDAR coordinates transformable into earth-centered, earth-fixed (ECEF) coordinates for versatility. The image datum can use images $340_{1-3}$ for the control system 170 to derive 2D annotations $350_{1-3}$ (e.g., object labels) and semantic segmentations $360_{1-3}$ of the driving scene.

Moreover, the storage and retrieval system 300 includes an agent datum having 3D agent and 2D agent data (e.g., coordinates for ado vehicles, snapshots of features, etc.) and a map datum having map information. The control system 170 can use the storage and retrieval system 300 to access data from a particular frame for Agent 1 robustly as agent schema instead of a general query, thereby improving bandwidth efficiency. In one approach, the control system 170 also retrieves data associated with multiple agents for a request. For example, the control system 170 retrieves frames specifically for Agent 1 and Agent 2 from frames t and t+1 in response to a request for data related to these agents. The control system 170 can also process a request to retrieve data particularly related to 3D agents or 2D agents. For example, Agent 1 has both 3D and 2D data, whereas Agent 2 has 3D data across times t−1, t, and t+1. Furthermore, the frames 310$_{1-3}$ can include a feature schema associated with surrounding vehicles to allow requests by particular features.

In various implementations, frames 310$_{1-3}$ can include an agent snapshot with features represented by a numerical value, numpy array, link to another frame, and so on. For example, the control system 170 represents the intent of an ego vehicle by parameters: {yaw_rate, steering_wheel_angle, torque_value, turn_signals_L, turn_signals_R, ego_lateral_offset_wrt_lane_center, lane_curvature, ego_heading_wrt_lane, L_lane_availability, R_lane_availability, throttle_position, brake_position, distance_to_nearest_front_intersection, Rasterized map}. Accordingly, this schema of agents allows comprehensive access to data across types for samples associated with a scene.

Figure 4:
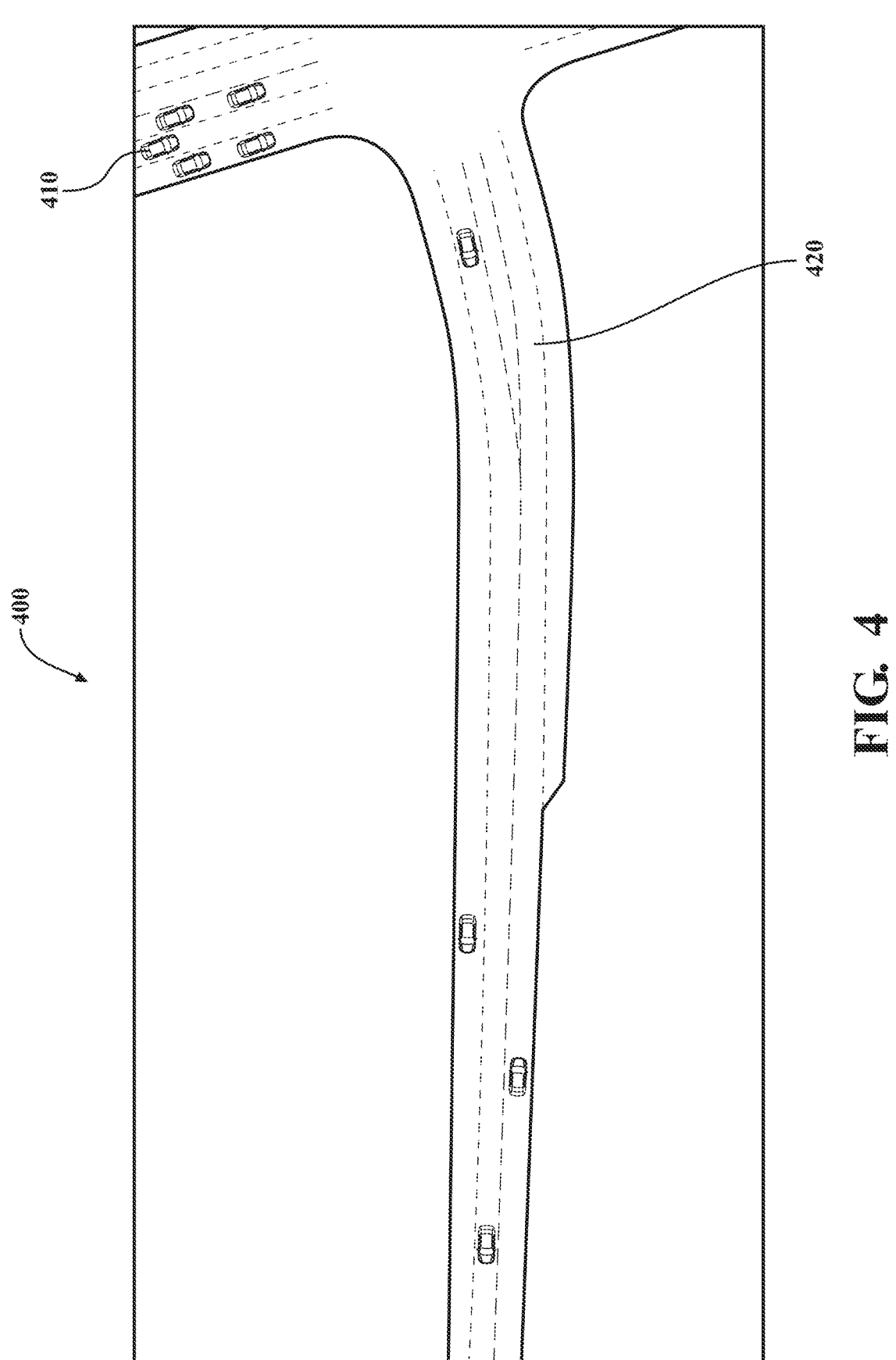
FIG. 4 illustrates an example of a driving scene having agents and map information structured as datums.

Regarding the map data 260, the control system 170 may form a map datum as an integrated and versatile dataset that simplifies access for vehicle tasks, such as machine learning (ML) computations. For example, the dataset represents a schema that facilitates training a map encoder of a ML model through various samples. As such, a map datum can include a map message 380 (e.g., lane information, vehicle coordinates for ado or ego vehicles, etc.), dynamic TCEs 385, zone information (e.g., road junction configurations), data from traffic lights, and so on elements. The map message 380 can include lane centers, lane boundaries, road boundaries, crosswalks, ramp information, transition information, and so on defined in 3D polyline or polygonal geometries. In one approach, the TCEs 385 can form a time-varying datum describing states of bulb groups associated with an upcoming traffic light, traffic signs, and so on. FIG. 4 illustrates an example of a driving scene 400 having agents 410 and map information 420 described by datums. Here, the datum for agents 410 includes inferences for attributes associated with 2D and 3D agents. Similarly, the datum for the map information 420 describes the number of lanes, traffic light states, and so on for the driving scene 400.

In various implementations, the control system 170 relates frames by tracks 3701 and 3702 for retrieval by vehicle systems that process multiple frames in blocks. A track can have a predetermined window (e.g., three frames) of scene information associated with an agent. As such, a track can include agent data and features according to type (e.g., 3D agents, 2D agents, etc.) across frames, samples, or times. In one approach, track-based access involves the control system 170 iterating tracks for a driving scene associated with various agents. For context-based access, the control system 170 iterates tracks for a driving scene associated with each agent.

Moreover, the control system 170 may slice agent information at a sample, timestamp, or time for context-based access. For example, the control system 170 iterates a window of frames in a driving scene for a plurality of scenes where a slice has samples across different agents having the same type. In the storage and retrieval system 300, this involves slicing 3D agent data to include agents slice 375 comprising Agent 1 and Agent 2 at sample t+1. Furthermore, a data slice may include 3D agent data and 2D agent data at the timestamp to service data requests across different multi-dimensional agents. Accordingly, the control system 170 associating frames by tracks or samples by slice improves access speed of cache memory and creates agile data retrieval since systems process data as needed instead of frame-by-frame. This also avoids assembling blocks of frames on-the-fly by learning models, systems controlling vehicle motion, and so on.

Figure 5:
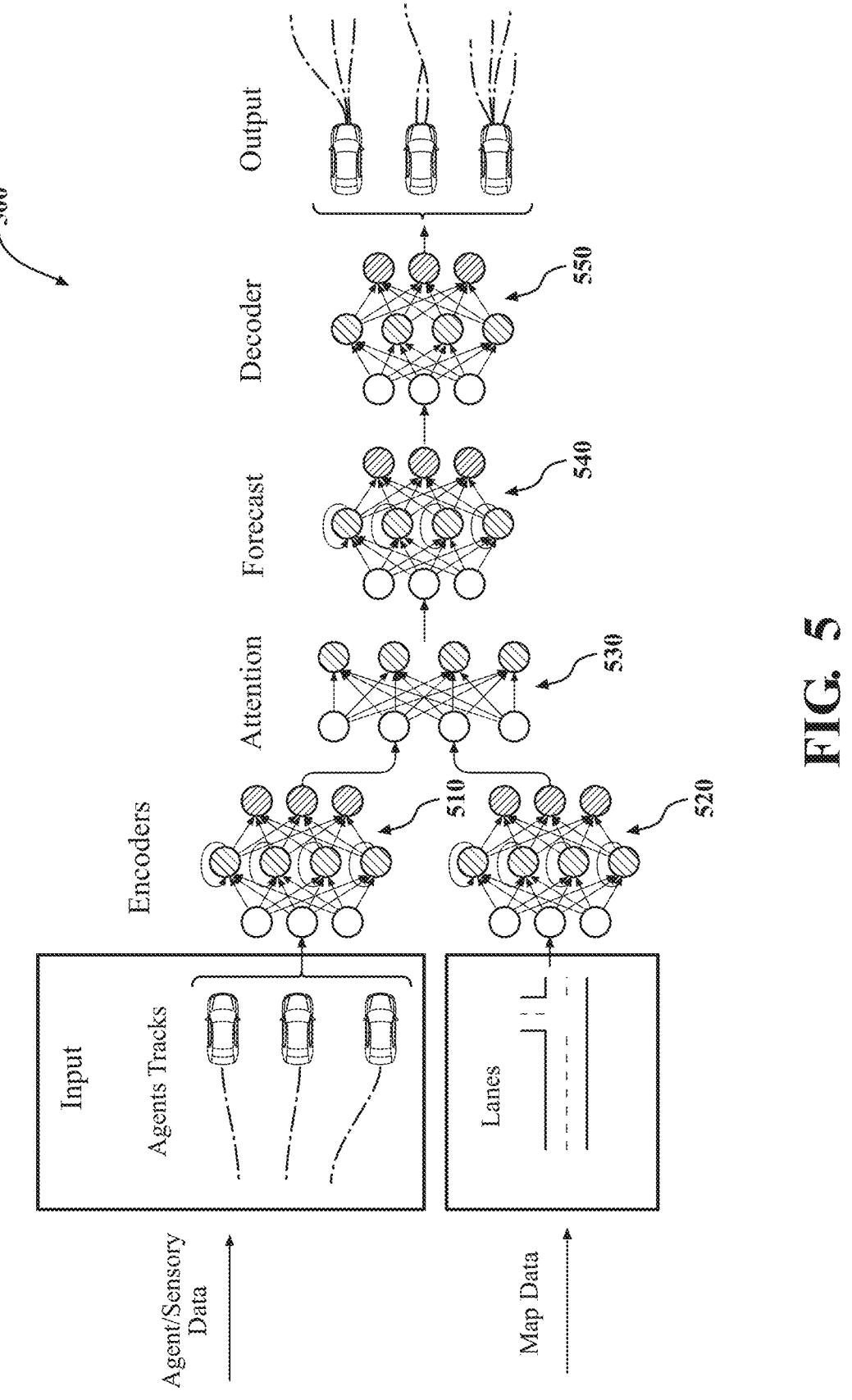
FIG. 5 illustrates one embodiment of training a learning model using sensor, agent, and map data.

FIG. 5 illustrates one embodiment of training a learning model 500 using sensor, agent, and map data arranged in datums either online or offline. Here, the training may involve the encoder 510 and the encoder 520 that transform agent tracks, sensor data, and map data spanning two seconds of agent history (e.g., location and state) through operations in the latent space. The transformation forms a neuron structure for processing by the attention operator 530. Moreover, the attention operator 530 and the forecast operator 540 may be neural networks (NN) that transform encoded information for the decoder 550 to complete inferences associated with agent vehicles. Attention involves focusing on certain parts of the encoded data in a sequence for an object. Forecasting involves estimating future values (e.g., trajectories) of the encoded data for various objects.

In various implementations, the encoder 510 selectively processes agent tracks or sensor data 250 cached in memory. This avoids processing and organizing frames sequentially as part of a preprocessing operation for the training by the learning model 500 as well as during inference, such as during fully automated mode. In particular, the control system 170 may relate frames in tracks or agents through slices using pointers, thereby allowing non-sequential or random access directly within tracks. This process can include using pointers for the sensor data 250 associated with the training. For example, tracks include 2D or 3D agent features accessible by blocks of multiple frames associated with a driving scene.

In one approach, the training involves the learning model 500 accessing or retrieving the agent perceptions from a data slice for the encoder 510. Here, the data slice includes information from the frame and another frame at a timestamp or snapshot having derived 3D or 2D perceptions associated with agents (e.g., ado agents). The encoder 510 extracts features associated with the 3D or 2D agents and the training computes loss functions for tuning the learning model 500 accordingly.

Figure 6:
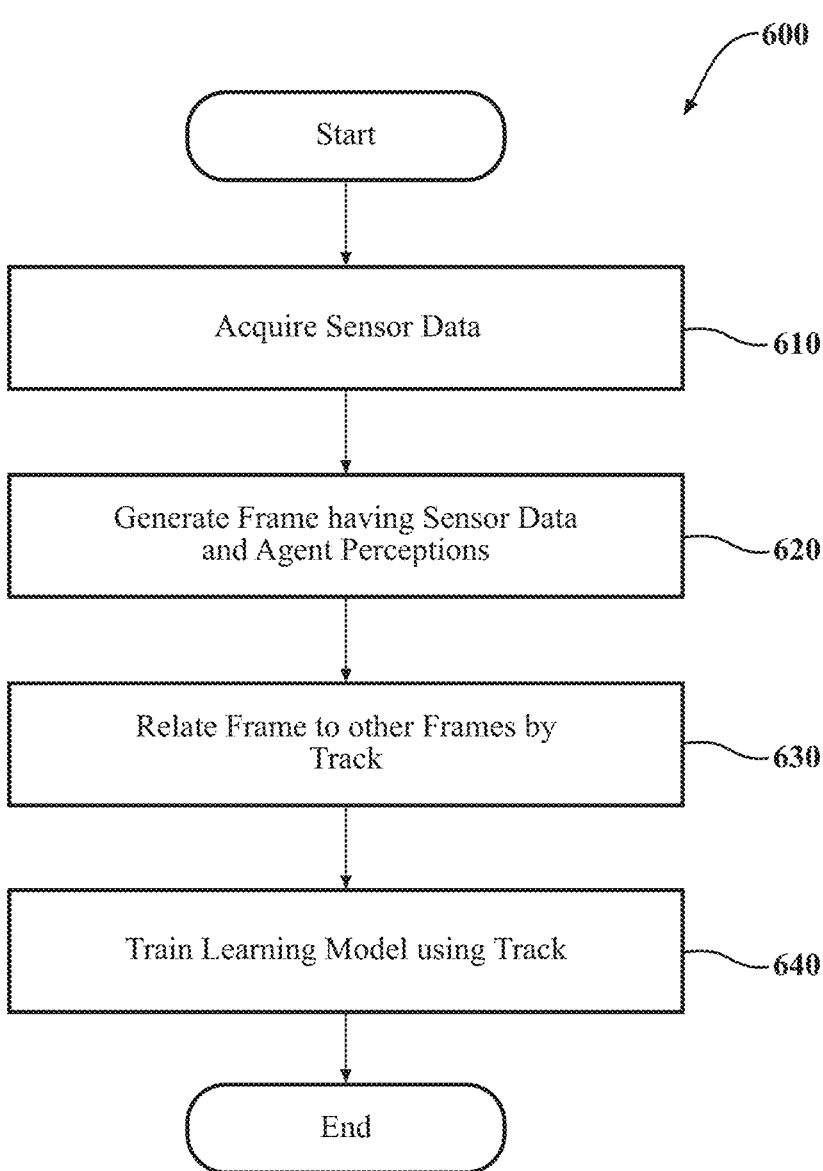
FIG. 6 illustrates one embodiment of a method that is associated with generating and relating frames having sensor data and agent perceptions from a vehicle.

Turning now to FIG. 6, a flowchart of a method 600 that is associated with generating and relating frames that improves the retrieval of sensor and agent data for processing by different vehicle tasks is illustrated. Method 600 will be discussed from the perspective of the control system 170 of FIGS. 1 and 2. While method 600 is discussed in combination with the control system 170, it should be appreciated that the method 600 is not limited to being implemented within the control system 170 but is instead one example of a system that may implement the method 600.

At 610, the control system 170 acquires sensor data for a sample or snapshot of a vehicle state. For example, the control system 170 acquires data from the vehicle sensor(s) 121 or one or more environment sensors 122. The data may be raw data for the vehicle 100, LIDAR data, and image data. The depth datum can use LIDAR data for the control system 170 to derive point clouds and 3D annotations for objects within a vehicle environment. A 3D annotation may be represented in LIDAR coordinates for compatibility with different vehicle systems. Furthermore, the image data can use images from one or more cameras 126 for the control system 170 to derive 2D annotations (e.g., object labels) and semantic segmentations of a driving scene.

Moreover, the control system 170 acquires 3D agent and 2D agent data (e.g., coordinates for ado vehicles, features snapshots, etc.) and map information. As previously explained, map information can include map messages (e.g., lane information, vehicle coordinates for ado or ego vehicles, etc.), dynamic TCEs, zone information (e.g., road junction configurations), data from traffic lights, and so on elements. In particular, map messages can include lane centers, lane boundaries, road boundaries, crosswalks, ramp information, transition information, and so on defined in 3D polyline or polygonal geometries.

At 620, the generation module 220 generates a frame having sensor data and agent perceptions for the sample or snapshot of the vehicle state. In particular, the generation module 220 forms a depth datum and an image datum using the sensor data associated with an agent-centric schema. In one approach, a datum is structured or synchronized data from various and disparate sources grouped by frames, slices, tracks, and so on. In particular, the control system 170 may synchronize data according to scene changes, agent changes, quality metrics, and so on. The depth datum can include the point clouds and 3D annotations for objects within the vehicle environment. The image datum can include 2D annotations (e.g., object labels) and semantic segmentations of the driving scene.

Regarding the agent perceptions, the generation module 220 creates an agent datum having data for 2D and 3D agents. This data includes coordinates for ado vehicles, snapshots of features, and so on. Here, the control system 170 structures data as datums for retrieving or accessing data from a particular frame non-sequentially, selectively, randomly, and so on instead of through a general query, thereby improving bandwidth efficiency and speed. For example, the control system 170 retrieves frames in FIG. 3 specifically for Agent 1 and Agent 2 from frames t and t+1 in response to a request for data related to these agents. In another example, the control system 170 can also process a request to retrieve data particularly related to 3D agents or 2D agents. In one approach, Agent 1 has both 3D and 2D data whereas Agent 2 has 3D data across times t−1, t, and t+1. In this way, the control system 170 provides agile retrieval by avoiding frame-by-frame access of the data.

Furthermore, the control system 170 may form and include a map datum in the frame as an integrated and versatile dataset that simplifies access for vehicle tasks. For example, the dataset acts as a schema that facilitates training a map encoder of a ML model through various samples. As previously explained, a map datum can include a map message, dynamic TCEs, zone information, data from traffic lights, and so on elements for selective retrieval by track or slice in response to a system request.

At 630, the control system 170 relates the frame to other frames by track. This adds versatility for systems that process multiple frames in blocks. In particular, a track may have a predetermined window of scene information associated with an agent. As such, a track can include agent data and features according to type (e.g., 3D agents, 2D agents, etc.) across frames, samples, or times. In one approach, track-based access involves the control system 170 iterating tracks for a driving scene associated with various agents. For context-based access, the control system 170 iterates tracks for a driving scene associated with each agent.

In various implementations, the control system 170 may slice agent information at a sample, timestamp, or time for context-based access. For example, the control system 170 iterates a window of frames in a scene where a slice has samples across different agents having the same type (e.g., 3D agents). In one approach, a data slice includes 3D agent data and 2D agent data at the timestamp to service data requests across different multi-dimensional agents. Accordingly, the control system 170 associating frames by tracks or samples by slice allows the processing of data as needed instead of frame-by-frame. Furthermore, this arrangement avoids delays from assembling blocks of frames on-demand.

Regarding an example of leveraging the agent-centric schema, at 640 the control system 170 trains a learning model using tracks of data. As previously explained, the agent-centric schema allows an encoder of the learning model to selectively process agent tracks or the sensor data 250 cached in memory. This avoids organizing frames sequentially as part of a preprocessing operation for training operations by the learning model. In particular, the control system 170 relates frames in tracks or slices using pointers, thereby allowing non-sequential or random access directly within tracks. For example, tracks include 2D or 3D agent features accessible by blocks of multiple frames associated with a driving scene.

Moreover, in one approach training involves the learning model accessing or retrieving the agent perceptions from a data slice for encoders. Here, the data slice includes the frame and another frame at a timestamp or snapshot having derived 3D or 2D perceptions associated with agents. The encoder 510 extracts features associated with the 3D or 2D agents and the training computes loss functions for tuning attention, forecast, decoder, and other model processes accordingly.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the control system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the control system 170, and/or the automated driving module(s) 160 may control some or all of the vehicle systems 140 and, thus, may be partially or fully autonomous as defined by the society of automotive engineers (SAE) levels 0 to 5.

The processor(s) 110, the control system 170, and/or the automated driving module(s) 160 can be operatively connected to communicate with the various vehicle systems 140 and/or individual components thereof. For example, returning to FIG. 1, the processor(s) 110, the control system 170, and/or the automated driving module(s) 160 can be in communication to send and/or receive information from the various vehicle systems 140 to control the movement of the vehicle 100. The processor(s) 110, the control system 170, and/or the automated driving module(s) 160 may control some or all of the vehicle systems 140.

The processor(s) 110, the control system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the control system 170, and/or the automated driving module(s) 160 can control the direction and/or speed of the vehicle 100. The processor(s) 110, the control system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system for improving information retrieval and access, comprising:
   a processor; and
   a memory storing instructions that, when executed by the processor, cause the processor to:
   acquire sensor data by a vehicle;
   generate a data frame including the sensor data and agent perceptions determined from the sensor data at a timestamp, the agent perceptions including multi-dimensional data that associates features of a scene retrieved from surrounding vehicles of the vehicle in a data slice that is associated with different agents that have a same dimensional type and context, and the different agents are vehicles;
   relate the data frame to other data frames of the vehicle by a track, the other data frames include having processed data from various times and the track having a predetermined window of the scene associated with an agent and the data frame, and the data slice spans the track and another track that include both two-dimensional (2D) agent data and three-dimensional (3D) agent data associated with a same agent that is moving; and
   train a learning model using the agent perceptions accessed from the track.

2. The control system of claim 1, wherein the instructions to train the learning model further include instructions to access, by an agent encoder, the agent perceptions from the data slice, and wherein the data slice includes the data frame and another data frame at the timestamp and the agent encoder extracts features for forming the multi-dimensional data.

3. The control system of claim 2, wherein the data slice includes the 3D agent data and the 2D agent data at the timestamp.

4. The control system of claim 1, wherein the instructions to generate the data frame further include instructions to form a map datum having traffic control data for the data frame at the timestamp for forming an agent schema where data access is system agnostic.

5. The control system of claim 4, wherein the instructions to train the learning model further include instructions to input the map datum to a map encoder, and wherein the learning model includes an agent encoder that processes the agent perceptions, and the map datum is time-varying and describes states of bulb groups associated with a traffic light in the scene.

6. The control system of claim 4, wherein the sensor data forms a depth datum with 3D data and an image datum with 2D data associated with characteristics of objects in the scene surrounding the vehicle.

7. The control system of claim 6, further including instructions to access the depth datum and the image datum non-sequentially and randomly associated with the data slice according to a request from a processing task for the vehicle.

8. The control system of claim 1, further including instructions to:
   synchronize agent information of the data frame and the other data frames in the track according to a predetermined time span; and
   retrieve, by the learning model, agent features from the data frame and the other data frames randomly across multiple tracks, wherein the agent features are associated with a 3D type and a 2D type.

9. A non-transitory computer-readable medium comprising:
   instructions that when executed by a processor cause the processor to:
   acquire sensor data by a vehicle;
   generate a data frame including the sensor data and agent perceptions determined from the sensor data at a timestamp, the agent perceptions including multi-dimensional data that associates features of a scene retrieved from surrounding vehicles of the vehicle in a data slice that is associated with different agents that have a same dimensional type and context, and the different agents are vehicles;
   relate the data frame to other data frames of the vehicle by a track, the other data frames include having processed data from various times and the track having a predetermined window of the scene associated with an agent and the data frame, and the data slice spans the track and another track that include both two-dimensional (2D) agent data and three-dimensional (3D) agent data associated with a same agent that is moving; and
   train a learning model using the agent perceptions accessed from the track.

10. The non-transitory computer-readable medium of claim 9, wherein the instructions to train the learning model further include instructions to access, by an agent encoder, the agent perceptions from the data slice, and wherein the data slice includes the data frame and another data frame at the timestamp and the agent encoder extracts features for forming the multi-dimensional data.

11. A method comprising:
   acquiring sensor data by a vehicle;
   generating a data frame including the sensor data and agent perceptions determined from the sensor data at a timestamp, the agent perceptions including multi-dimensional data that associates features of a scene retrieved from surrounding vehicles of the vehicle in a data slice that is associated with different agents that have a same dimensional type and context, and the different agents are vehicles;
   relating the data frame to other data frames of the vehicle by a track, the other data frames include having processed data from various times and the track having a predetermined window of the scene associated with an agent and the data frame, and the data slice spans the track and another track that include both two-dimensional (2D) agent data and three-dimensional (3D) agent data associated with a same agent that is moving; and training a learning model using the agent perceptions accessed from the track.

12. The method of claim 11, wherein training the learning model further comprises accessing, by an agent encoder, the agent perceptions from the data slice, and wherein the data slice includes the data frame and another data frame at the timestamp and the agent encoder extracts features for forming the multi-dimensional data.

13. The method of claim 12, wherein the data slice includes the 3D agent data and the 2D agent data at the timestamp.

14. The method of claim 11, wherein generating the data frame further comprises forming a map datum having traffic control data for the data frame at the timestamp for forming an agent schema where data access is system agnostic.

15. The method of claim 14, wherein training the learning model further comprises inputting the map datum to a map encoder, and wherein the learning model includes an agent encoder that processes the agent perceptions, and the map datum is time-varying and describes states of bulb groups associated with a traffic light in the scene.

16. The method of claim 14, wherein the sensor data forms a depth datum with 3D data and an image datum with 2D data associated with characteristics of objects in the scene surrounding the vehicle.

17. The method of claim 16, further comprising accessing the depth datum and the image datum non-sequentially and randomly associated with the data slice according to a request from a processing task for the vehicle.

18. The method of claim 11, further comprising:

synchronizing agent information of the data frame and the other data frames in the track according to a predetermined time span; and retrieving, by the learning model, agent features from the data frame and the other data frames randomly across multiple tracks, wherein the agent features are associated with a 3D type and a 2D type.

* * * * *